United States Patent [19]
Capps et al.

[11] Patent Number: 5,465,325
[45] Date of Patent: Nov. 7, 1995

[54] METHOD AND APPARATUS FOR MANIPULATING INKED OBJECTS

[75] Inventors: Stephen P. Capps; Ernest H. Beernink, both of San Carlos, Calif.

[73] Assignee: Apple Computer, Inc., Cupertino, Calif.

[21] Appl. No.: 68,442

[22] Filed: May 27, 1993

Related U.S. Application Data

[63] Continuation-in-part of Ser. No. 977,145, Nov. 16, 1992.
[51] Int. Cl.⁶ .................................................. G06F 15/62
[52] U.S. Cl. .................................................. 395/141
[58] Field of Search ........................... 395/137, 192, 395/141; 382/9, 22, 41, 44; 345/147, 148, 149, 16, 17

[56] References Cited

U.S. PATENT DOCUMENTS

| | | | |
|---|---|---|---|
| 5,261,033 | 11/1993 | Oka | 395/142 |
| 5,287,417 | 2/1994 | Eller et al. | 382/41 |

OTHER PUBLICATIONS

"Apple banking on Newton's brain" (O'Connor) San Jose Mercury News, Apr. 22, 1992.
"A Step toward the Future" (Weiman et al.) Macworld, Aug. 1992, pp. 129–131.
"Your World According tro Newton" (Soviero) Popular Science, Sep. 1992, pp. 45–49.
"From the Editor" (Abatemarco) Popular Science, Sep. 1992, p. 4.
Macintosh User's Guide (Apple Computer, Inc.) 1991, pp. 47–50.

*Primary Examiner*—Phu K. Nguyen
*Attorney, Agent, or Firm*—Hickman & Beyer

[57] ABSTRACT

A method for manipulating an inked object with a pointing device on a pen based computer system includes receiving an ink stroke made with a pointing device, displaying the ink stroke on a screen of the computer system and creating a representative stroke within the computer system from the ink stroke. Upon the receipt of a user-initiated command, the representative stroke is first manipulated and then the ink stroke is manipulated in accordance with the representative stroke. Only the ink stroke is displayed on the screen. Examples of manipulation of the inked object include sizing, distorting, and deleting segments of the inked object. The method of the present invention is preferably practiced as a computer implemented process on a pen-based computer system.

16 Claims, 14 Drawing Sheets

METHOD AND APPARATUS FOR MANIPULATING INKED OBJECTS

CROSS-REFERENCE TO RELATED APPLICATIONS

This application is a continuation-in-part of U.S. patent application 07/977,145 filed Nov. 16, 1992 entitled "Method for Manipulating Objects on a Computer Display" of Capps et al., assigned to the assignee of the present invention, the disclosure of which is hereby incorporated herein by reference in its entirety.

BACKGROUND OF THE INVENTION

This invention relates generally to the manipulation of images on a computer screen, and more particularly to methods for scaling, distorting, deleting or otherwise altering the image of an object on the screen of a pen-based computer system.

Computerized personal organizers are becoming increasingly popular with a large segment of the population. Computerized personal organizers tend to be small, lightweight, and relatively inexpensive, and can perform such functions as keeping a calendar, an address and telephone book, a to-do list, etc. While many of these functions can also be provided in conventional computer systems, personal organizers are very well suited to the personal organization task due to their small size and portability. Personal organizers are available from such companies as Sharp and Casio of Japan.

A relatively new form of computer, the pen-based computer system, holds forth the promise of a marriage of the power of a general purpose computer with the functionality and small size of a personal organizer. A pen-based computer system is typically a small, hand-held computer where the primary method for inputting data includes a "pen" or stylus. A pen-based computer system is commonly housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, text and numeric information can also be entered into the pen-based computer system in a similar fashion.

In the prior art, it has not been possible to manipulate or edit "inked" objects. Inked objects that have been "recognized" and displayed in a cleaned-up form can be manipulated in a straight-forward fashion because the nature of the recognized object is well understood. However, it would be desirable to be able to perform certain types of manipulation on a non-recognized object, i.e. directly on an inked object. For example, it would be desirable to be able to scale an inked object upwardly or downwardly in size, distort sides of an inked object, and delete portions of an inked object without going through a recognition routine and without replacing the inked object with a recognized version of the object.

SUMMARY OF THE INVENTION

The present invention allows an inked object to be manipulated and edited while it is still "ink." This permits the essential nature of the inked object to remain on the screen, while providing a variety of editing capabilities for the pen system.

A method for manipulating an inked object in accordance with the present invention includes the steps of: a) receiving an ink stroke made by a pointing device of a computer system; b) displaying the ink stroke on a screen of the computer system; c) creating a representative stroke within the computer system from the ink stroke; d) receiving a user-initiated command impacting at least a portion of the representative stroke; e) manipulating the ink stroke in the computer system in accordance with the user-initiated command; and f) displaying the manipulated ink stroke on the screen of the computer system.

Preferably, the computer system comprises a pen computer system (i.e., either a pen-based computer system or a pen-aware computer system), and the pointing device comprises a stylus mechanism which can engage a screen of the pen computer system. The step of creating a representative stroke in the computer system preferably includes the steps of finding ends and corners of the raw stroke and creating a simplified representative stroke (i.e., a "clean" stroke) from these ends and corners. The user-initiated commands are preferably gestures made by the stylus on the screen of the pen computer system which engage or otherwise select one or more segments of the "clean" stroke. The "clean" stroke is then manipulated, and the associated raw stroke is likewise manipulated. Preferably, the representative or "clean" stroke is not displayed on the screen of the pen computer system, thereby providing the appearance of allowing the direct manipulation of an inked object on the computer screen.

An apparatus for manipulating an inked object on a computer screen includes: a) a central processing unit (CPU); b) a screen coupled to the CPU; c) a pointer mechanism coupled to the CPU; d) a mechanism for receiving an ink stroke made by the pointer mechanisms; e) a mechanism for creating a representative stroke from the ink stroke; f) a mechanism for receiving a command made by the pointer mechanism which impacts at least a portion of the representative stroke; g) a mechanism for manipulating the ink stroke in accordance with the gesture; and h) a mechanism for displaying the manipulated ink stroke on the screen. The CPU, screen, and pointer mechanism preferably comprise a pen computer system where the pointer mechanism is a stylus which can engage the screen of the computer system.

The advantage of the present invention is that free-hand drawings of graphical objects can be made on the screen of a pen computer system and then can be manipulated as desired. There are many instances when a user would not want to have graphical inputs "recognized" for artistic or aesthetic reasons, or because the user simply desires to have a graphical object displayed exactly as it was entered. The method and apparatus of the present invention therefore allows graphical objects to be input and displayed in their raw ink form, but still permits a certain amount of manipulation and editing of the inked object as desired by the user.

These and other advantages of the present invention will become apparent upon reading the following detailed descriptions and studying the various figures of the drawings.

DETAILED DESCRIPTION OF THE PREFERRED EMBODIMENTS

The present invention is well suited for pointer based computer systems such as the pen-based, stylus-based and mouse driven systems that are currently popular. For the purposes of illustration, the invention will be described in connection with a pen-based system.

Figure 1:
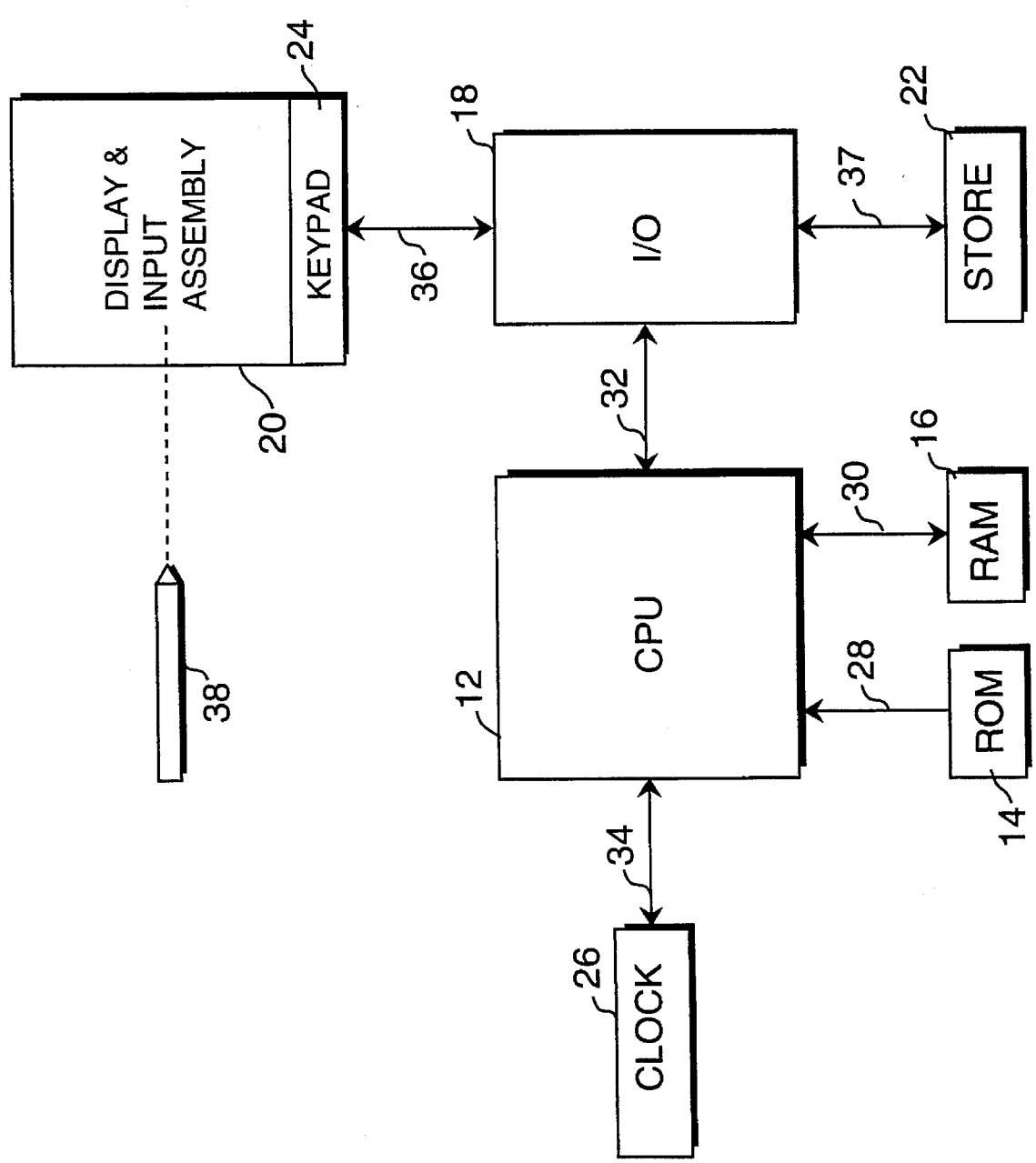
FIG. 1 is a block diagram of a computer system in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22 such as a disk drive unit or nonvolatile memory such as flash memory, a keypad 24, and a clock 26.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 28. ROM 14 contains the basic operating system for the pen-based computer system 10. CPU 12 is connected to RAM 16 by a bi-directional data bus 30 to permit the use of RAM 16 as scratch pad memory. ROM 14 and RAM 16 are also coupled to CPU 12 by appropriate control and address busses, as is well known to those skilled in the art. CPU 12 is also coupled to the I/O circuitry 18 by bi-directional data bus 32 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display assembly 20, mass storage 22, and the keypad 24.

Clock 26 preferably comprises a real-time clock to provide real-time information to the system 10. Clock 26 is coupled to CPU 12 by a data bus 34.

Display assembly 20 of pen-based computer system 10 is both an input and an output device. Accordingly, it is coupled to I/O circuitry 18 by a bi-directional data bus 36. When operating as an output device, the display assembly 20 receives data from I/O circuitry 18 via bus 36 and displays that data on a suitable screen. The screen for display assembly 20 is preferably a liquid crystal display (LCD) of the type commercially available from a variety of manufacturers. The input device of display assembly 20 is preferably a thin, clear membrane which covers the LCD display and which is sensitive to the position of a stylus 38 on its surface. With such a structure, the display assembly 20 can serve as an input "tablet." These position sensitive membranes are also readily available on the commercial market. Combination display assemblies such as display assembly 20 which include both the LCD and the input membrane are commercially available from such vendors as Scriptel Corporation of Columbus, Ohio.

The keypad 24 can comprise an array of switches. In the present embodiment, the keypad 24 comprises "button" areas provided along the bottom edge of the membrane which covers the LCD display. When the "buttons" are depressed, the membrane senses the pressure and communicates that fact to the CPU 12 via data bus 36 and I/O 18.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Some type of mass storage 22 is generally considered desirable. Mass storage 22 can be coupled to I/O circuitry 18 by a bi-directional data bus 37. However, the mass storage 22 can be eliminated by providing a sufficient amount of RAM 16 to store user application programs and data. In that case, the RAM 16 could be provided with a backup battery to prevent the loss of data even when the pen-based computer system 10 is turned off. However, it is generally desirable to have some type of long term storage 22 such as a commercially available miniature hard disk drive, nonvolatile memory such as flash memory, battery backed RAM, PC-data cards, or the like.

In operation, information is input into the pen-based computer system 10 by "writing" on the screen of display assembly 20 with a stylus 38. Information concerning the location of the stylus 38 on the screen of the display assembly 20 is input into the CPU 12 via data bus 36 and I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14 and/or RAM 16. The CPU 12 next produces data which is output to the display assembly 20 to produce appropriate images on its screen.

Figure 2:
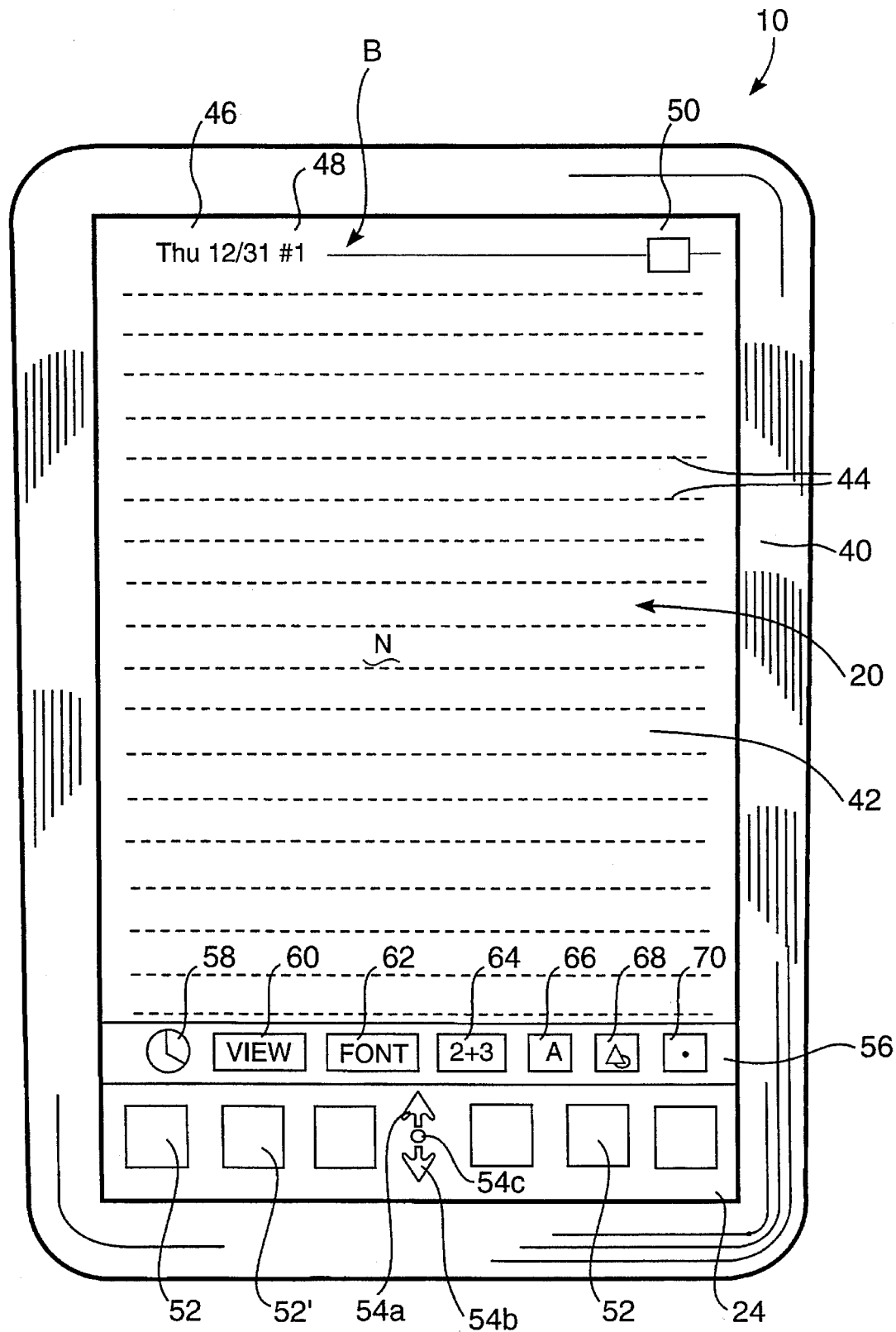
FIG. 2 is a top plan view of the screen, case, and keypad of the computer system of FIG. 1.

In FIG. 2, the pen-based computer system 10 is shown housed within a generally rectangular enclosure 40. The CPU 12, ROM 14, RAM 16, I/O circuitry 18, mass storage 22, and clock 26 are preferably fully enclosed within the enclosure 40. The display assembly 20 is mostly enclosed within the enclosure 40, but a viewing screen 42 of the display assembly is exposed to the user. As used herein, the term "screen" will refer to the portion of the display assembly 20 which can display an image that can be viewed by a user. Also accessible to the user is the keypad 24.

Upon power-up, pen based computer system 10 displays on screen 42 an initial note area N including a header bar B and a number of guidelines 44. The header bar B preferably includes the date of creation 46 of the note N, a note number 48, and a "toolbox" button 50. The optional guidelines 44 aid a user in entering text, graphics, and data into the pen-based computer system 10.

In this preferred embodiment, the keypad 24 is not a part of the viewing screen 42 but rather, is a permanent array of input buttons coupled to the CPU 12 by I/O circuitry 18. Alternatively, the keypad 24 could comprise "soft buttons" i.e. images generated at convenient locations on the screen 42, in which case a "button" would be activated by touching the stylus to the screen over the image of the button. The keypad 24 preferably includes a number of dedicated function buttons 52 and a pair of scroll buttons 54a and 54b. The operation of the scroll buttons 54a and 54b, and other aspects of computer system 10 are discussed in greater detail in co-pending U.S. patent application Ser. No. 07/868,013, filed Apr. 13, 1992 on behalf of Tchao et al., entitled "Method for Manipulating Notes on a Computer Display", assigned to the assignee of the present invention and incorporated herein by reference in its entirety. In this embodiment, the toolbox button 50 is represented as a "soft button" in the header bar B. However, in alternative embodiments, a physical keypad button could be used in its place.

The screen illustrated in FIG. 2 is referred to as the "notepad", and is an application program running under the operating system of the pen based computer system 10. In this preferred embodiment, the notepad is a special or "base" application which is always available beneath higher level applications. The notepad application, like other applications, run within a window, which in this instance comprises the entire viewing screen 42. Therefore, as used herein, a "window" is the entire screen or any portion of an entire screen which is dedicated to a particular application program.

A status bar 56 is provided at the bottom of the notepad application. The status bar 56 is provided with a number of active areas including a real time clock 58, a view button 60, a font button 62, an equations button 64, a text button 66, a graphics button 68, and a nib button 70. U.S. patent application Ser. No. 07/976,970 filed Nov. 16, 1992 on behalf of Foster et. al, entitled "Status Bar for Application Windows" and assigned to the assignee of the present invention describes how to make and use the status bar, and is incorporated herein by reference in its entirety.

Figure 3A:
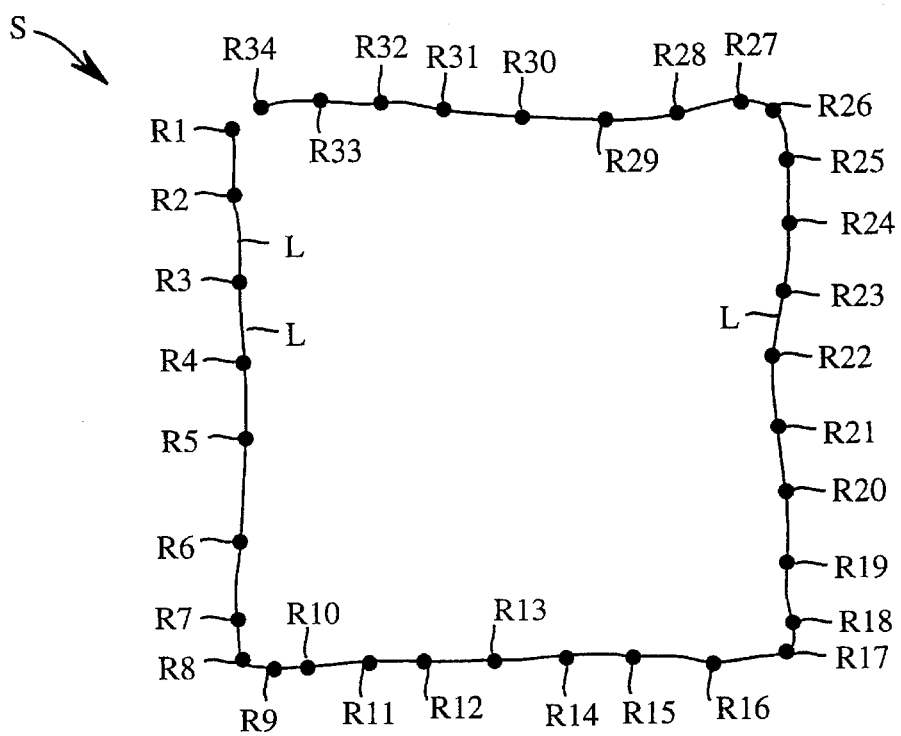
FIG. 3a represents a graphical object or "stroke" entered into the pen computer system of the present invention in a "raw ink" form.

In FIG. 3a, an ink stroke S, hereafter referred to as a "raw stroke" or "RAWSTROKE" is entered onto the screen 42 with stylus 38. The RAWSTROKE S is comprised of a great many individual data points, each of which has an (x,y) coordinate. As explained previously, the pixels of screen 42 are conveniently laid out in an (x,y) matrix, with the X axis positioned horizontally and the Y axis positioned vertically. By convention, the X value increases from left to right, and the Y value increases from top to bottom.

The individual data points of the RAWSTROKE S are labeled R1–R34 in this example. Line segments L connect adjacent "R" points of RAWSTROKE S to provide a depiction of the stroke S on the screen 42. In this example, it is assumed that point R1 was the first point entered into the computer system 10, and the point R34 is the last point entered. These points can, of course, also be entered in the reverse direction, or in other orders.

The line segments L of the present invention are preferably drawn on the screen 42 with graphics software such as QUICKDRAW, developed by Apple Computer, Inc. of Cupertino, Calif. A description of the QUICKDRAW graphics software is found in the book *Inside Macintosh, Volumes I, II, and II*, by C. Rose et al., Addison-Wesley Publishing Company, Inc., July 1988. With such graphics software, a line can be drawn by simply specifying the Cartesian coordinates of the beginning and the end of the line, a rectangle or "box" can be placed around objects by specifying the corner points of the box, text can be drawn to the screen by specifying font, size, and location, etc. Therefore, the use of such graphics software greatly simplifies the screen drawing process of the present invention.

Figure 3B:
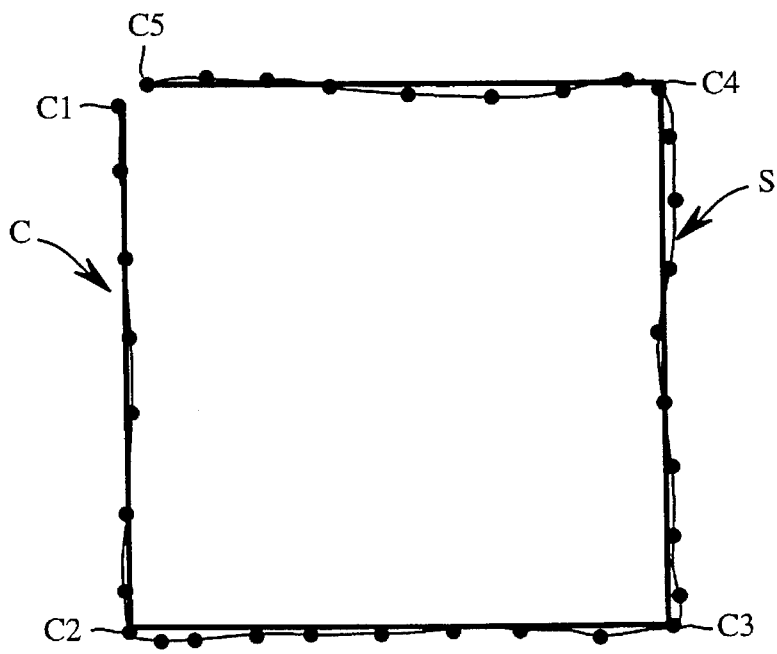
FIG. 3b illustrates the raw inked stroke along with a representative "clean" stroke developed by the process of the present invention.

In FIG. 3(b), a representative stroke C is shown superimposed over the RAWSTROKE S. This representational stroke C will hereinafter be referred to as a "clean stroke" or as "CLEANSTROKE". CLEANSTROKE C has five points labeled C1, C2, C3, C4 and C5. As will be explained subsequently, these points C1–C5 correspond to end-points and "corners" of the RAWSTROKE S. In this example, the point C1 corresponds to point R1, the point C2 corresponds to the point R8, the point C3 corresponds to the point R17, the point C4 corresponds to the point R26, and the point C5 corresponds to the point R34. By providing a CLEANSTROKE C associated with the RAWSTROKE S, the RAWSTROKE S can be manipulated and edited as if it was a recognized object while still maintaining its essential "ink" appearance.

Figure 4A:
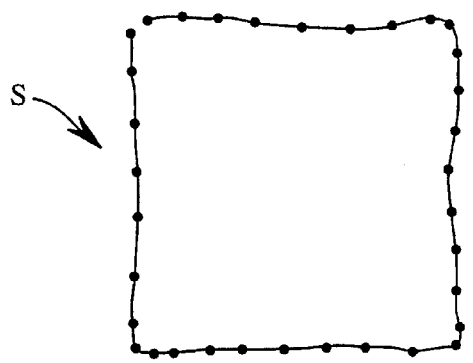
FIGS. 4a–4d illustrate process steps for scaling up in size the raw ink stroke of FIG. 4a to form the raw ink stroke shown in FIG. 4d.
Figure 4B:
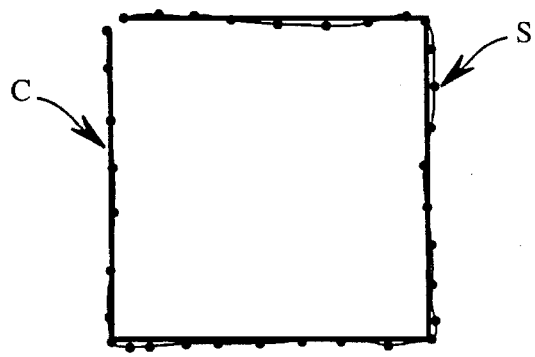
Figure 4C:
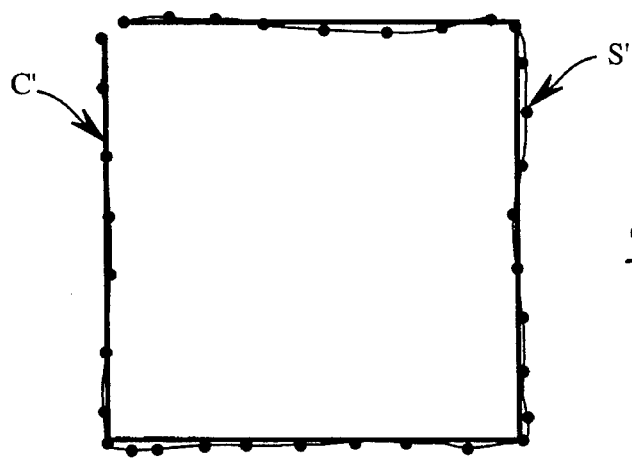

One such manipulation of the RAWSTROKE S is illustrated with reference to FIGS. 4A–4D. In FIG. 4A, a RAWSTROKE S is illustrated. A CLEANSTROKE C is generated from the RAWSTROKE S by a computer implemented process of the present invention. The CLEANSTROKE C is shown superimposed on the RAWSTROKE S in FIG. 4B. This CLEANSTROKE C may be, but is preferably not, displayed on the screen 42 of system 10. The entirety of the RAWSTROKE S and (by implication) the entirety of CLEANSTROKE C are then selected by an appropriate process. Several selection processes are disclosed in copending U.S. patent application No. 07/888,741, filed May 26, 1992, entitled "Method for Selecting Objects on a Computer Display" of Capps, and assigned to the assignee of the present invention, the disclosure of which is hereby incorporated by reference in its entirety. Next, a scaling factor is entered into the computer system 10 to indicate the amount that the RAWSTROKE S and CLEANSTROKE C should be scaled upwardly or downwardly. A method for entering scaling factors for selected objects is described in Parent U.S. patent application Ser. No. 07/977,145 of Capps et al., the disclosure of which was previously incorporated by reference. This results, in this example, in the scaling up of the RAWSTROKE S and the CLEANSTROKE C as illustrated in FIG. 4C. The upward scaling in this instance is approximately 40%. The manipulated RAWSTROKE S is shown at S', and the manipulated CLEANSTROKE C is shown at C' in FIG. 4C. Finally, in FIG. 4D, the RAWSTROKE S' is illustrated as it would be displayed on the screen 42 of computer system 10.

Figure 4D:
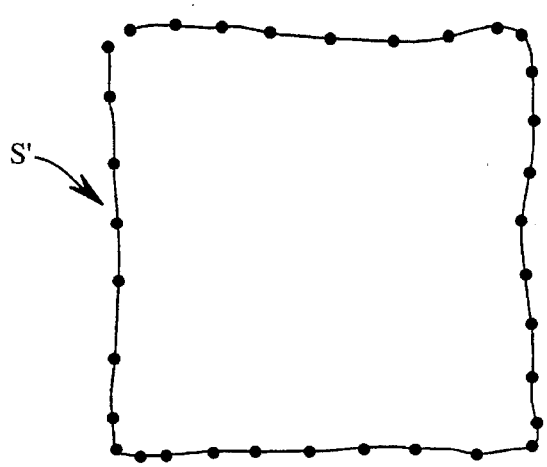

As will be noted in the discussion of FIGS. 4A–4D, a user is allowed to manipulate or edit the RAWSTROKE of FIG. 4A to provide the manipulated RAWSTROKE S' shown in FIG. 4D. Since the CLEANSTROKE C of FIG. 4B and C' of FIG. 4C are preferably not shown on the screen 42 of the computer 10, from the viewpoint of the user the RAWSTROKE S is being directly manipulated on screen 42 by stylus 38.

Figure 5A:
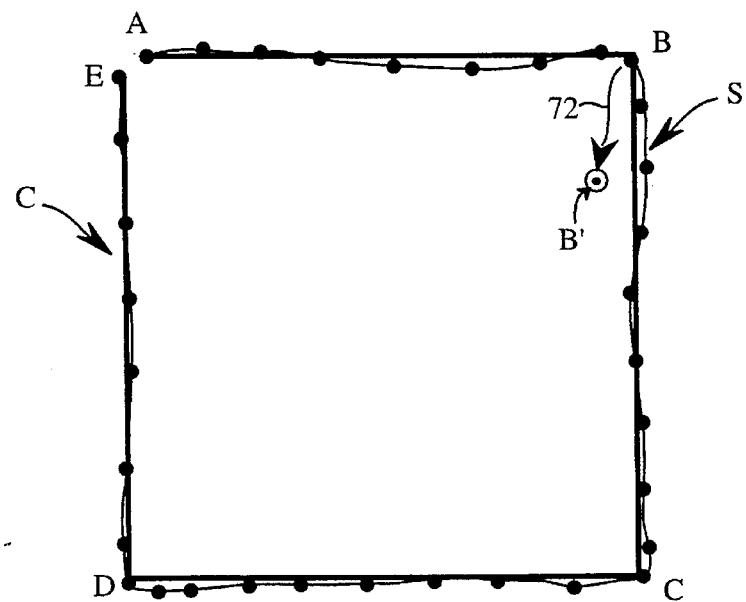
FIGS. 5a and 5b illustrate a distorting process of the present invention.
Figure 5B:
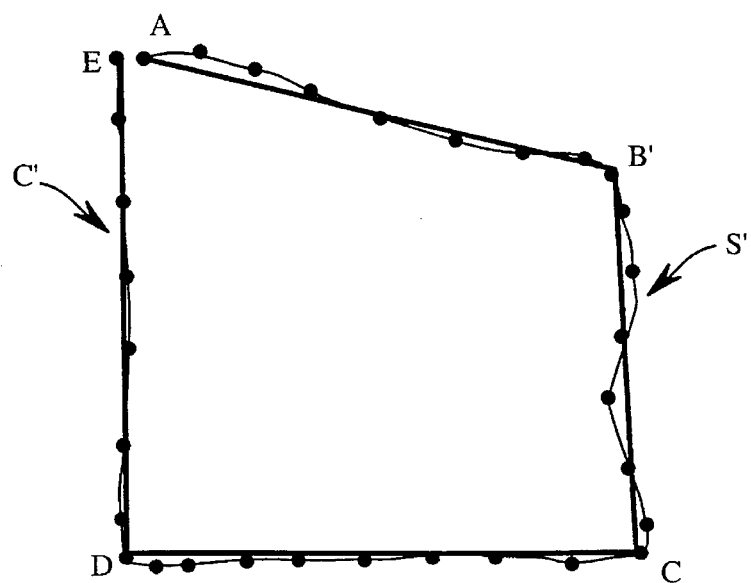

Another form of inked object manipulation is illustrated in FIGS. 5A and 5B. In FIG. 5A, a RAWSTROKE S has been entered into the computer system 10 and a CLEANSTROKE C has been calculated from the RAWSTROKE. Again, the CLEANSTROKE C is preferably not shown on the screen 42 of the computer system 10, although it may, in certain embodiments of the present invention, be shown at the user's option. The corner B of the RAWSTROKE S and the CLEANSTROKE C is then "dragged" to a new position at B', as indicated by arrow 72. A "dragging" gesture of the present invention involves engaging the tip of stylus 38 with the screen 42 over the point to be dragged (here point B), the movement of the tip of the stylus 38 across the screen 42 to a new point B', and the subsequent removal of the tip of the stylus 38 from the screen 42. The point B is therefore implicitly selected by the engagement of the stylus 38 with the screen 42 over the point B. Alternatively, the point B can be explicitly selected, such as by encircling the point B with a small, circular gesture. Methods for selecting objects and parts of objects are disclosed in copending U.S. patent application 07/888,741 of Capps, the disclosure of which is hereby incorporated herein by reference in its entirety.

The results of the corner-dragging distortion illustrated by FIG. 5A is shown in FIG. 5B. The line segment AB of FIG. 5A has been transformed into a line segment AB', and the line segment BC has been transformed to the line segment B'C. In other words, the dragging action illustrated by arrow 72 in FIG. 5A causes two segments of the CLEANSTROKE C to pivot and scale, and the points of the RAWSTROKE S are likewise pivoted and scaled along with the segments that they are associated. The "distorted" RAWSTROKE is shown at S' in FIG. 5B, and the "distorted" CLEANSTROKE C is shown at C' in FIG. 5B.

Figure 6A:
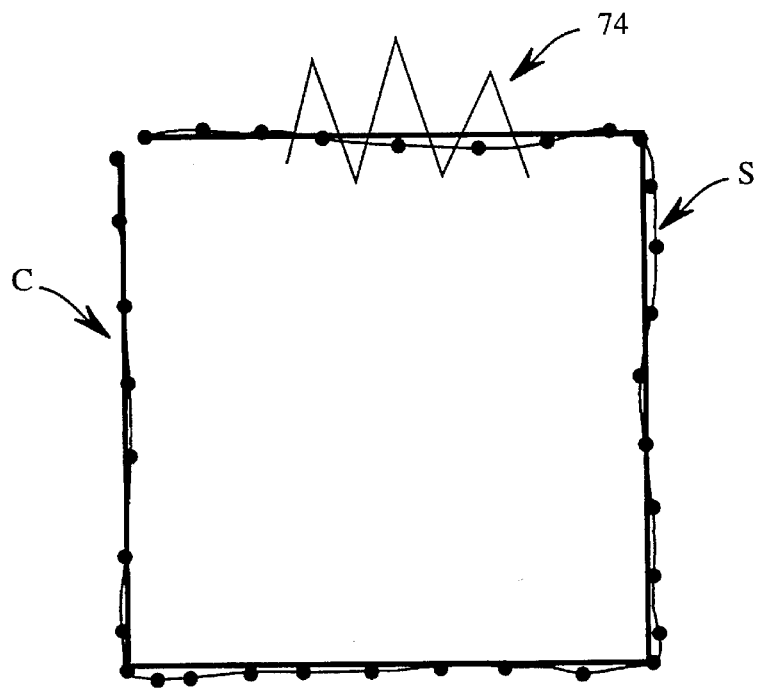
FIGS. 6a and 6b illustrate a delete process of the present invention.
Figure 6B:
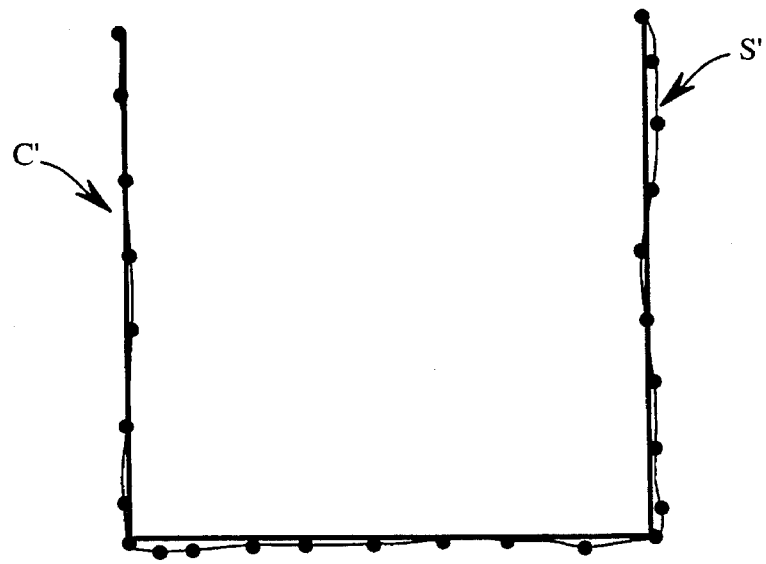

FIGS. 6A and 6B illustrate yet another method of manipulating an inked object in accordance with the present invention. In FIG. 6A, a RAWSTROKE S has been entered into the computer system 10, and a CLEANSTROKE C has been formed from the RAWSTROKE S. A "scrub" gesture 74 comprising a plurality of zigzag line segments has been entered by a user with a stylus 38 to indicate that the portion of the RAWSTROKE S which coincides with the segment of the CLEANSTROKE C that is being scrubbed is to be deleted. Again, preferably the user does not see the CLEANSTROKE C. The result of this "scrub" or delete function is illustrated in FIG. 6B. Preferably, the user would only see the modified RAWSTROKE S' and not the modified CLEANSTROKE C'.

Figure 7:
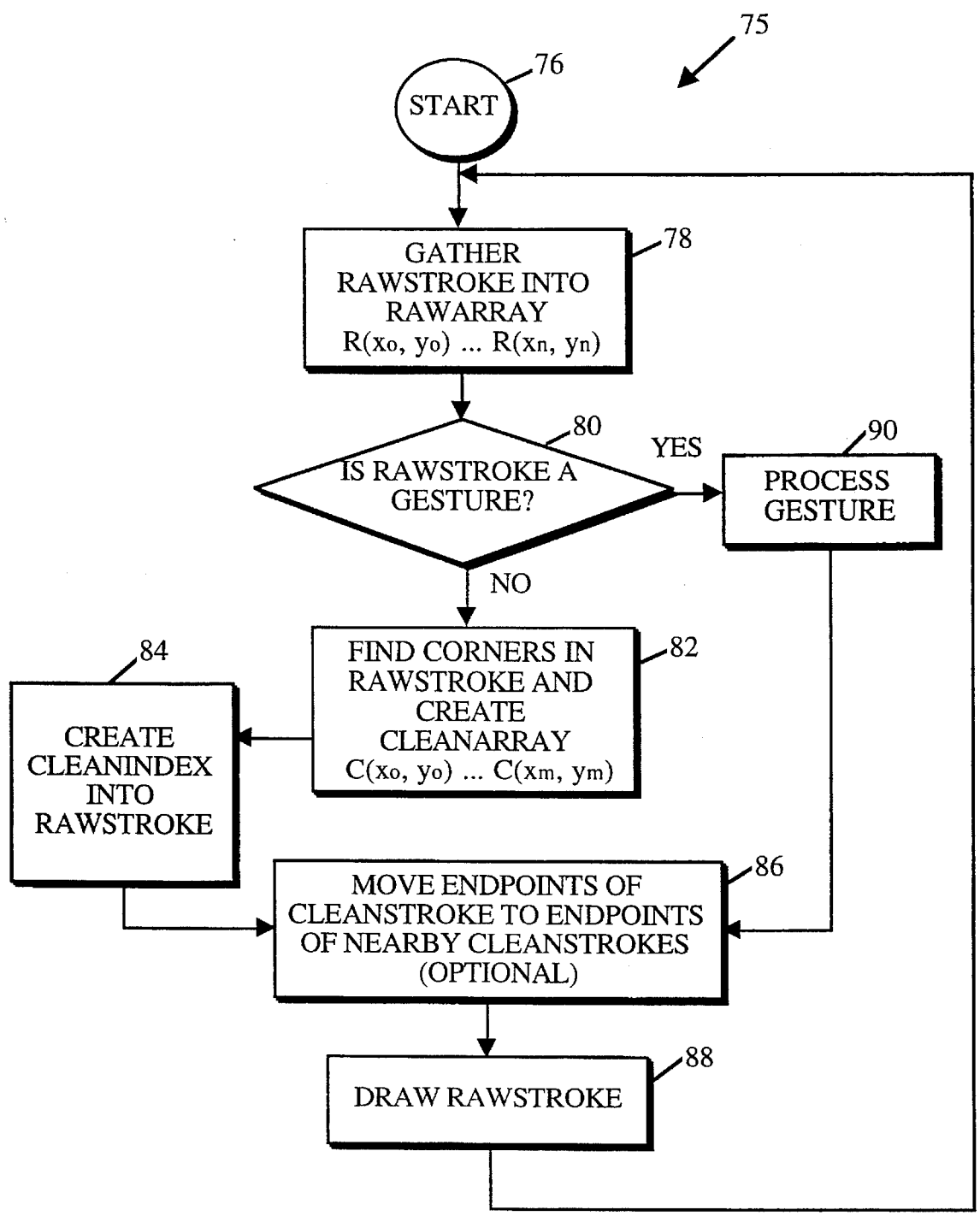
FIG. 7 is a flow diagram illustrating a computer-implemented process for manipulating inked objects in accordance with the present invention.

In FIG. 7, a computer implemented process 75 in accordance with the present invention begins at 76 and, in a step 78, a RAWSTROKE made by stylus 38 on screen 42 is gathered into an array named RAWARRAY. The stroke data points can be conveniently represented as RAWARRAY($X_0$, $Y_0$) ... RAWARRAY($X_n,Y_n$), where there are n+1 points in the RAWARRAY. As described previously, the dual function screen assembly 20 can automatically provide these data points at regularly-timed intervals.

Next, in a decision step 80, it is determined whether RAWSTROKE is a recognizable gesture. Methods for recognizing gestures can be found in the aforementioned U.S. patent application Ser. No. 07/888,741 of Capps. It should also be noted that some gesture recognizers can recognize a gesture before the completion of a stroke. In this instance steps 78 and 80 are, to some degree, combined. If it is determined that the RAWSTROKE is not a gesture, a step 82 finds corners in the RAWSTROKE and creates a new array called "CLEANARRAY" which stores the datapoints of CLEANSTROKE. The points of CLEANARRAY are conveniently stored as CLEANARRAY ($X_0,Y_0$) ... CLEANARRAY ($X_m,Y_m$), where there are m+1 points in CLEANARRAY. Next, in a step 84, a new array named "CLEANINDEX" is created which maps the points of CLEANARRAY into the points of RAWARRAY.

Step 86 of the present invention is optional. Step 86 allows the endpoints of CLEANSTROKE to be joined with endpoints of adjacent CLEANSTROKES that had been previously entered into the system 10. This permits closely-associated RAWSTROKES to be manipulated as if they had been joined together into an integral whole, without changing the appearance or spatial relationship between the two RAWSTROKES. For example, if two straight line RAWSTROKES are drawn along a common axis and are separated end-to-end by only a small distance, the endpoints of the CLEANSTROKES associated with the two RAWSTROKES will be joined end-to-end, allowing the two RAWSTROKES to be manipulated as a single RAWSTROKE. However, the two RAWSTROKES themselves are not joined and thus will still be visibly separated on the screen, because only the CLEANSTROKES (which are preferably invisible) are joined together by this process. Of course, in alternate embodiments, the RAWSTROKES can also be joined together in this fashion. Also, adjacent CLEANSTROKES and/or adjacent RAWSTROKES could be joined together at "gravity points" other than endpoints, e.g. such as at corners, etc.

After the optional step 86 is completed, or after step 84 is completed if step 86 is omitted, a step 88 draws RAWSTROKE on the screen 42 of the computer 10, and process control is returned to step 78 to await new RAWSTROKES being entered into the computer system.

If the decision step 80 determines that the RAWSTROKE entered into the computer system 10 was a gesture, process control is turned over to the "PROCESS GESTURE" step 90 of FIG. 7. After the gesture has been processed by step 90, process control is returned to optional step 86 or, if step 86 is omitted, then directly to step 88.

Figure 8:
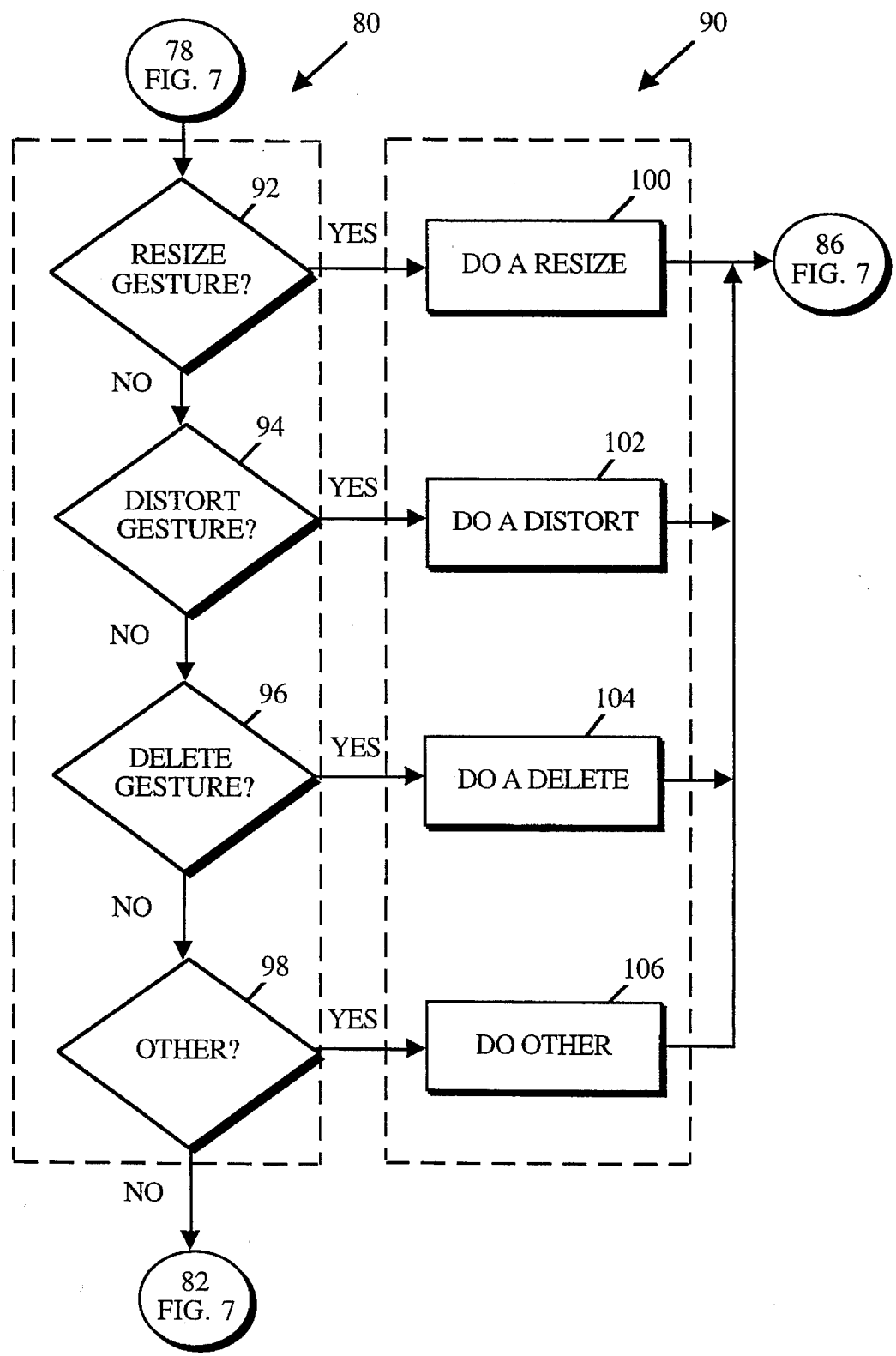
FIG. 8 is a flow diagram illustrating the steps 80 and 90 of FIG. 7 in greater detail.

FIG. 8 illustrates steps 80 and 90 of FIG. 7 in greater detail. The entry point into this flow diagram is from step 78 of FIG. 7, and the exit points from this flow diagram are to steps 82 and 86 of FIG. 7.

Step 80 includes a number of decision steps numbered as 92, 94, 96 and 98. As will be apparent to those skilled in the art, there are many ways of performing the decisions of step 80 other than the sequence of decision steps illustrated. For example, the RAWSTROKE can be sent to an appropriate "gesture recognizer" which will return a gesture type and other parameters. Gesture recognizers are known to those skilled in the art. Alternatively, the decisions of steps 92–98 can be performed in any order.

With continuing reference to FIG. 8, the step 90 of "process gesture" includes a number of computer implemented processes labeled herein as steps 100, 102, 104, and 106. If step 92 determines that RAWSTROKE is a resize gesture, the process 100 "DO A RESIZE" is performed. If step 94 determines that RAWSTROKE is a distort gesture, process 102 "DO A DISTORT" is performed. If step 96 determines that RAWSTROKE is a delete gesture, process 104 "DO A DELETE" is processed, and if step 98 determines that another gesture is made by RAWSTROKE, another process 106 is performed. Copending U.S. patent application No. 08/070,094, filed on May 27, 1993 on behalf of Capps et al., entitled "Method for Deleting Objects on a Computer Display" and assigned to the assignee of the present invention describes methods for deleting objects with a scrub gesture, and is hereby incorporated herein by reference in its entirety. An example of other processes include "kinking" a line segment to create a new vertex or corner, etc.

Figure 9:
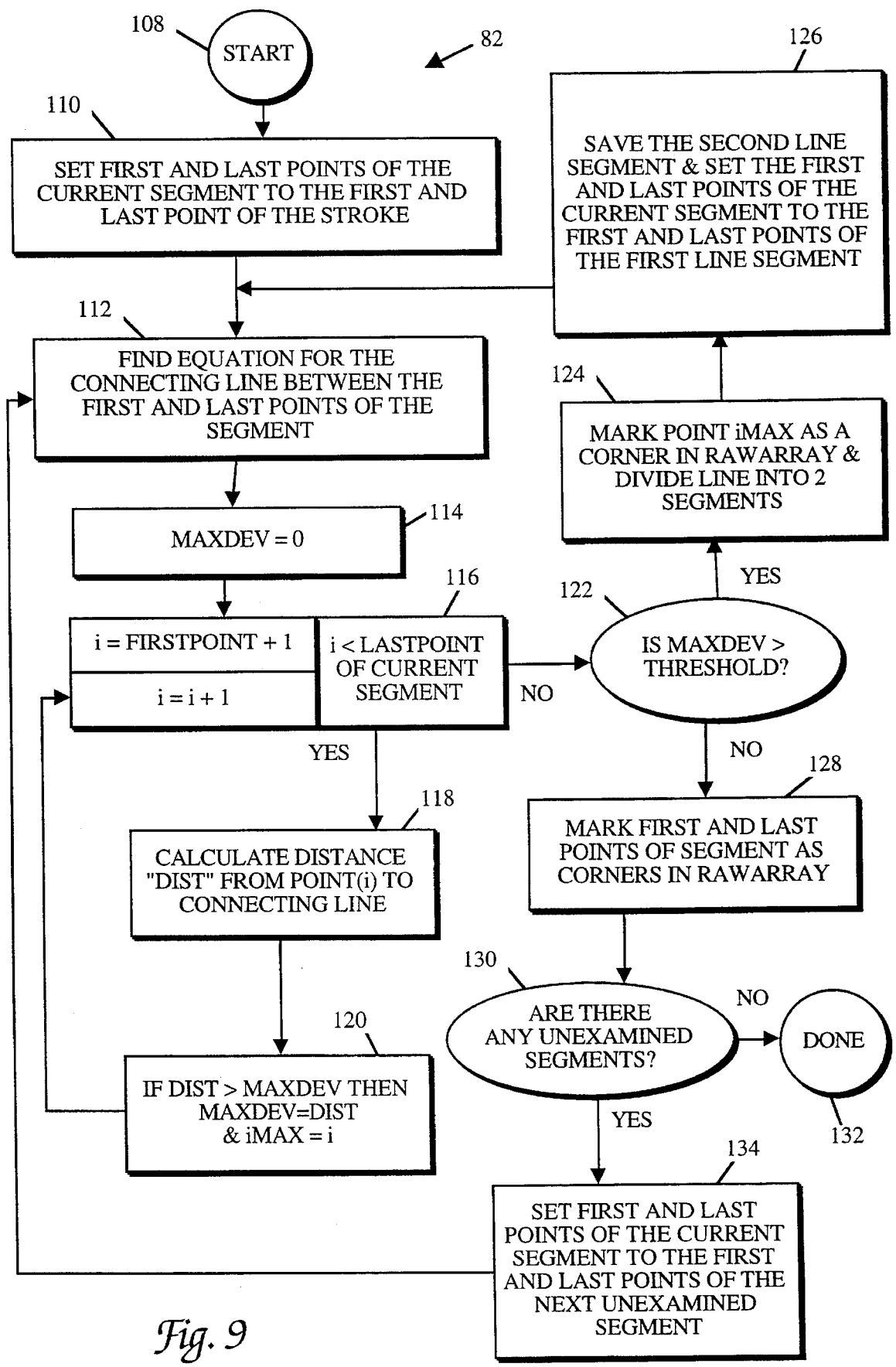
FIG. 9 is a flow diagram illustrating the step 82 of FIG. 7 in greater detail.

Turning next to FIG. 9, the corner identification technique of step 82 will be described in further detail. Conceptually, in this process, an imaginary line is drawn between the first and last points in RAWSTROKE. Then the remaining points in RAWSTROKE are compared to the position of the imaginary line to determine which point is furthest from the line. If the point that is furthest from the line is more than a predetermined offset distance away from the imaginary line, then it is defined as a corner point of RAWSTROKE. The process is then recursively repeated on each line segment until a set of processed points is developed wherein none of actual points on the line segment input by the user are further than the predetermined threshold offset distance from the adjacent line between corner points. The mathematical technique used to implement this approach is called an "Iterative End-Point Fits Process" and is described by Duda et al. in their text *Pattern Classification and Scene Analysis*, John Whiley & Sons, 1973.

As seen in FIG. 9, the process 82 begins at 108 and, in a step 110, first and last points of the initial segment that is to be processed looking for a corner (Current Segment) are set to the first and last points of the entire stroke. Then in step 112, the CPU 12 determines the equation for an imaginary connecting line that extends between the first and last points of the current segment. After the imaginary line has been calculated, the value MAXDEV is set to zero in step 114. In the loop that follows, the value MAXDEV will be used to store the distance of the point that is farthest from the imaginary line. In step 116 a loop is initiated to determine which point is furthest from the imaginary line. A counter "i" is set to the value of the first point in the current segment plus one. Thus, the initial point that is checked is the point that is next to the first point. In step 118, the distance DIST from point (i) to the imaginary connecting line is calculated. Then in step 120, the value calculated for DIST is compared to the value MAXDEV. If the value of DIST is greater than MAXDEV, then the point (i) is the furthest point from the imaginary line that has been calculated so far, and the value MAXDEV is reset to equal DIST and a value iMAX is set equal to the current counter value "i". Thereafter, the logic loops back to step 116 where the counter "i" is incremented and the incremented counter value is compared to the point number of the last point in the current segment. As long as the value of counter "i" is less than the point number of the last point in the current segment, the loop including steps 118 and 120 is repeated. In this manner, the point furthest from the imaginary line can be readily determined.

After all of the intermediate points have been checked, the value of counter "i" is incremented to the number of the last point in the current segment and the logic moves to step 122 where it determines whether MAXDEV is greater than a predetermined threshold as described above. If so, point iMAX is designated as a corner and is marked as such in RAWARRAY, and two line segments that are created between the corner and the respective first and last points of the current segment are created in step 124. Then in step 126, the first of the new line segments is set to the current line segment and the second new line segment is saved for a recursive analysis at a later point. After step 126, the logic returns to step 112 where the process is repeated until the value MAXDEV of a particular line segment is less than or equal to the predetermined threshold value.

When the value MAXDEV associated with a particular line segment is less than or equal to the predetermined threshold value, the first and last points of the current segment are marked as corners in step 128 in RAWARRAY. Then in step 130, the logic checks to determine whether there are any unexamined segments. If not, the process is completed as indicated at 132. If there is an unexamined segment, the first and last points of the current segment are set to equal the first and last points of the next unexamined segment in a step 134. Then the logic returns to step 112 where the entire process is repeated until the entire stroke has been broken into small enough line segments so that none of the line segments deviate from the original stroke by more than the predetermined threshold offset.

Figure 10:
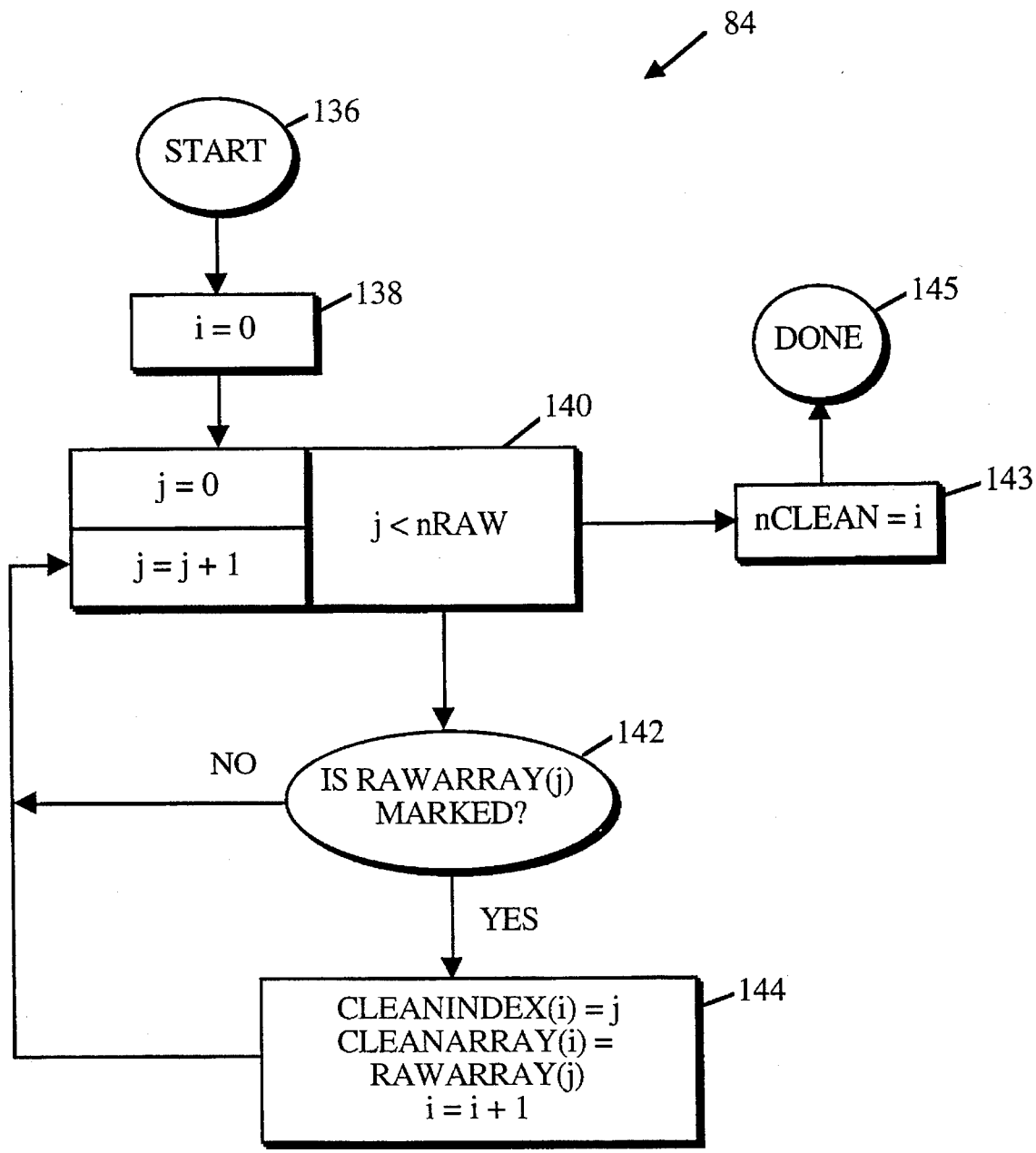
FIG. 10 is a flow diagram illustrating step 84 of FIG. 7 in greater detail.

In FIG. 10, step 84 "CREATE CLEANINDEX" is described in greater detail. The process 84 begins at 136 and, in a step 138, a counter i is initialized to zero. Then, in an iterative loop step 140, a counter j is initialized to zero, and is compared to the variable nRaw. The variable nRaw is the number of points in RAWARRAY. If j is less than nRaw, a decision step 142 determines whether RAWARRAY(j) was previously marked as a corner. If not, process control is returned to step 140 and the counter j is incremented. If RAWARRAY(j) was previously marked as a corner, CLEANINDEX(i) is set to j; CLEANARRAY(i) is set to RAWARRAY(j); and the counter i is incremented by 1 in a step 144. In this manner, CLEANARRAY is built from the marked corner points of RAWARRAY, and CLEANINDEX is built to "map" points of the CLEANARRAY onto corresponding points of RAWARRAY so that manipulation of part or all of the CLEANARRAY can be translated into manipulation(s) of appropriate segments or all of the RAWARRAY. It is in this fashion that the raw data points of RAWSTROKE can be manipulated as if they had been "recognized." When j>nRaw, a step 143 stores the value of i in nClean and the process is completed at 145.

The points of the CLEANARRAY do not have to be exactly equal to an equivalent point in RAWARRAY in step 142. If a point of CLEANARRAY is within a predetermined short distance of a point of RAWARRAY, then that CLEANARRAY point can be mapped to that RAWARRAY point.

Figure 11:
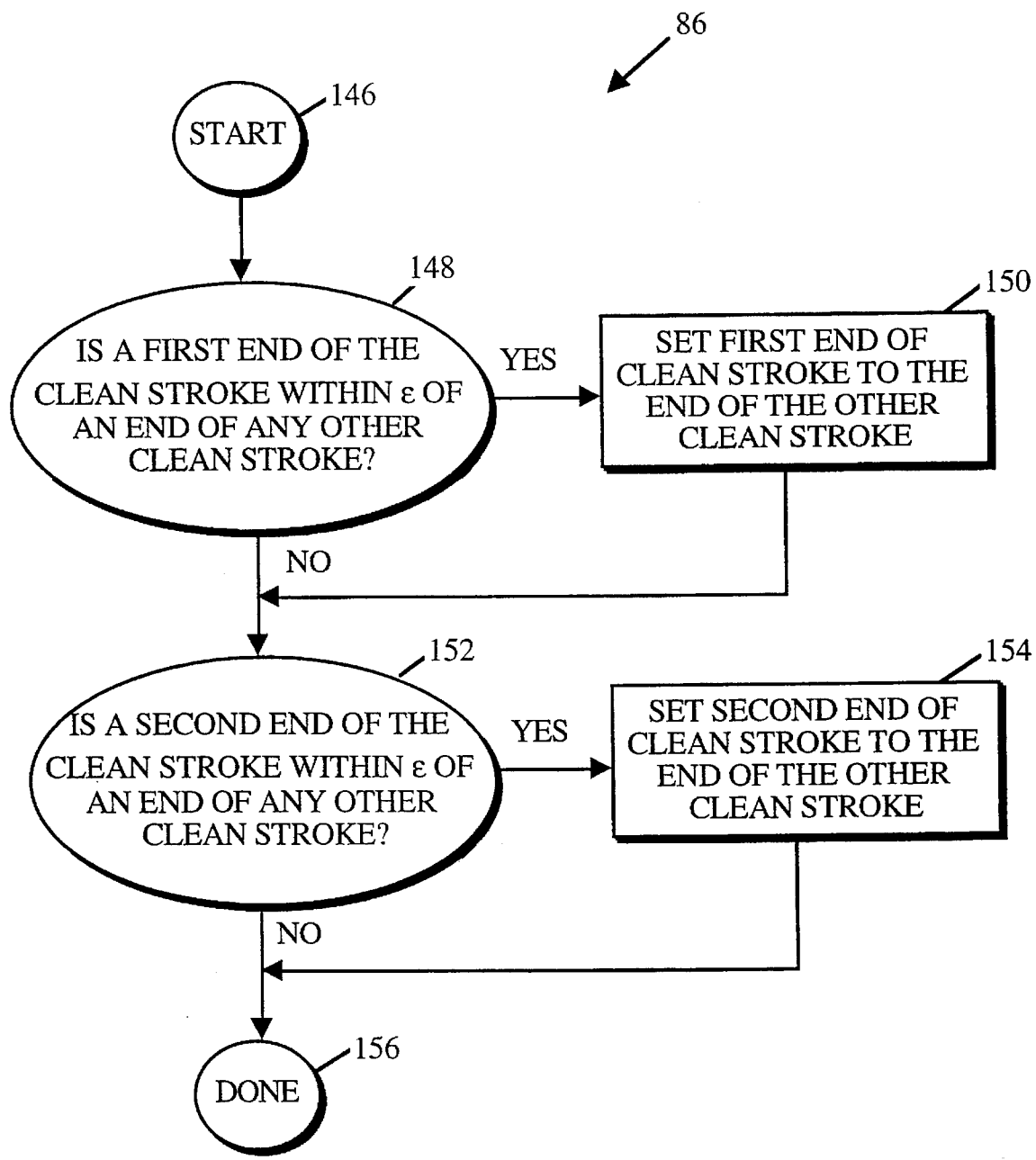
FIG. 11 is a flow diagram illustrating step 86 of FIG. 7 in greater detail.

In FIG. 11, step 86 "MOVE ENDPOINTS" of FIG. 7 is discussed in greater detail. Process 86 begins at 146 and, in a step 148, it is determined whether a first end of the clean stroke is within a distance e of an end of any other clean stroke. This distance e can be any small number, such as 1–5 pixels on the screen 42. If the first end of the CLEANSTROKE is within $\epsilon$ of an end of a previous CLEANSTROKE, a step 150 sets the first end of the clean stroke to the end of the other clean stroke. Preferably, only the first end of the clean stroke is moved, and the second end remains fixed. After the completion of step 150, or in the event of a negative determination by step 148, a step 152 determines whether a second end of the CLEANSTROKE is within $\epsilon$ of an end of another CLEANSTROKE. If so, the second end of the CLEANSTROKE is connected to the end of the adjacent CLEANSTROKE. Again, a distance $\epsilon$ of 1–5 pixels has been found to be appropriate. After the completion of step 154, or after a negative determination by step 152, the process 86 is complete as indicated at 156.

This step 86 has the effect of functionally, but not literally, "joining together" RAWSTROKES, which apparently belong together. This allows multiple strokes to be manipulated together, e.g., to be resized as a unit, distorted as a unit, deleted as a unit, etc. by the processes of the present invention. However, since only the CLEANSTROKES are "joined", the configurations and orientations of the various RAWSTROKES remain constant. For example, if end points of two raw strokes are closely separated and the raw strokes are sized upwardly together as a unit, the end points will still be separated by an appropriately sized-up distance. Similar processes can join endpoints to corners, and corners to corners.

Preface to Stroke Object Manipulation Discussion

Mathematical techniques for resizing, rotating, and otherwise transforming objects (such as a stroke object) are well known to those skilled in the art. For example, see *Principles of Interactive Computer Graphics*, Second Edition, *Newman & Sproull,* McGraw-Hill, Inc., 1979, 1973, pages 57–60. Some of these known mathematical techniques are used in the computer implemented processes of the present invention, e.g. "Resizing a Stroke" and "Distorting a Stroke", as explained below.

Resizing a Stroke

Figure 12:
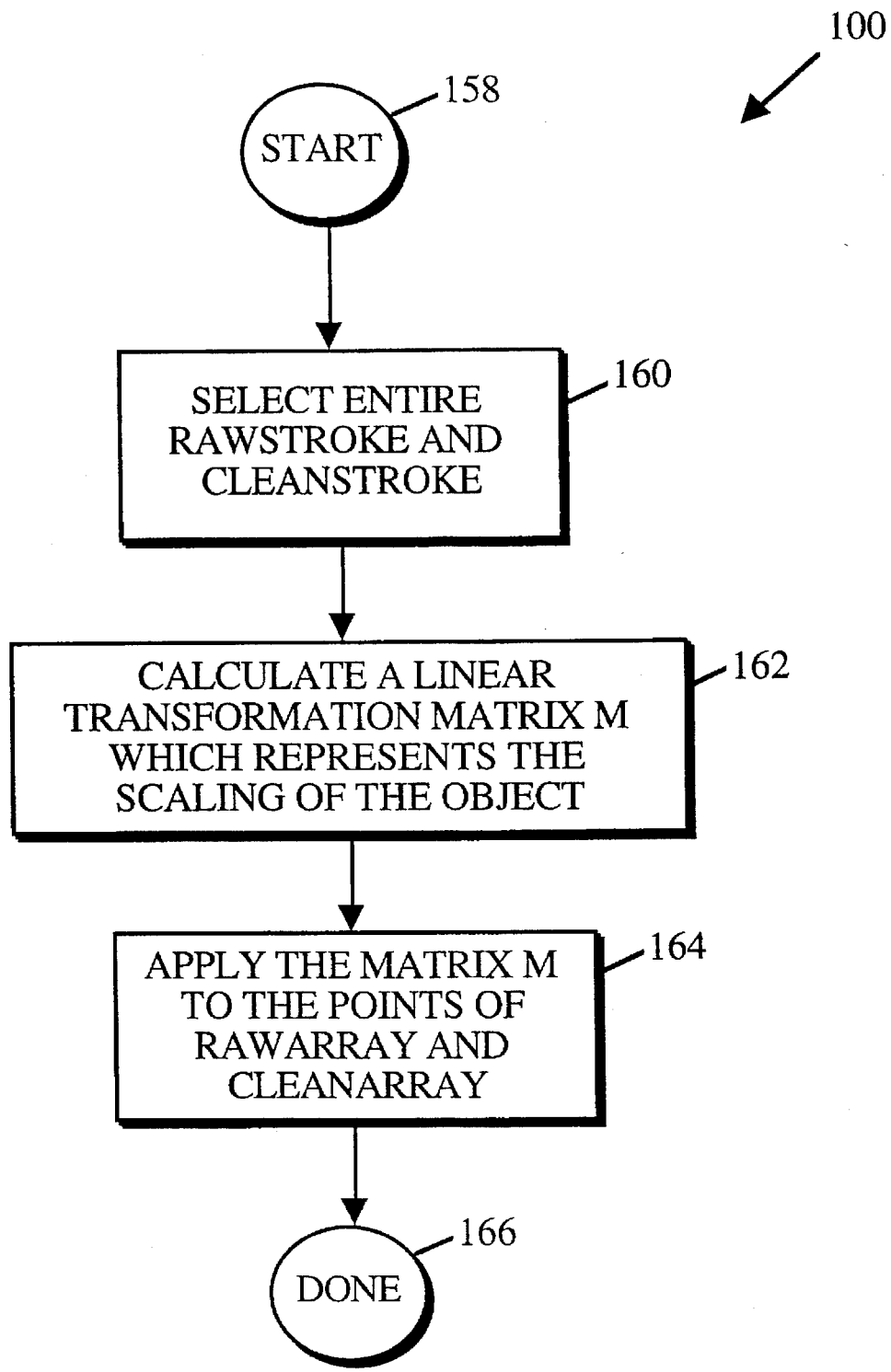
FIG. 12 is a flow diagram illustrating step 100 of FIG. 8 in greater detail.

In FIG. 12, step 100 of FIG. 8 is illustrated in greater detail. Process 100 begins at 158 and, in a step 160, the entire RAWSTROKE and CLEANSTROKE are selected by some appropriate technique. Again, methods for selecting objects are described in copending U.S. patent application Ser. No. 07/888,741. Next, in a step 162, a linear transformation matrix M representing the scaling of the object is calculated. In a step 164, the matrix M is applied to all of the points of the raw array and the clean array. The process 100 is then completed at 166.

The calculation of the linear transformation matrix M of step 162 is preferably accomplished as follows. First, a linear translation matrix A is created as follows:

$$A = \begin{matrix} 1 & 0 & 0 \\ 0 & 1 & 0 \\ -Ox & -Oy & 1 \end{matrix}$$

This linear translation matrix A, when multiplied by the points in an array representing a stroke, will cause the origin of the stroke to become its upper lefthand corner. That is to say, A×S (where S is an array containing the points of an arbitrary stroke S) will cause the upper left-hand corner of the bounding box for the stroke S to have the coordinates (0,0). In this matrix, the upper left-hand point of the bounding box of the stroke, before translation, had the (x,y) coordinates of (Ox, Oy).

Instead of immediately applying the linear translation matrix A to RAWARRAY and CLEANARRAY, several more intermediate matrices are formed. A first of these is a linear scaling matrix B, which is calculated as follows:

$$B = \begin{matrix} Sx & 0 & 0 \\ 0 & Sy & 0 \\ 0 & 0 & 1 \end{matrix}$$

This linear scaling matrix B, when multiplied by the points of a stroke, causes the stroke to scale in the X direction by Sx and in the Y direction by Sy. The multiplication of the matrix B times the points of the stroke should take place after the origin has been translated to the upper left-hand corner of the bounding box of the stroke by multiplying the points of the stroke by the matrix A. Otherwise, the scaling may cause distortion of the graphical object. If Sx is greater than 1, then points will move away from the origin, and if Sx is less than 1 points will move towards the origin. The same is true with the Y scaling with regards to the Y scaling factor Sy. Therefore, for example, to uniformly scale a graphical object up by 25%, the X scaling factor Sx and the Y scaling factor Sy would each have a value of 1.25.

The final intermediate matrix is a linear translation matrix C which moves the upper left-hand corner of the bounding box of the stroke back to its original position, i.e. the matrix C reverses the action of matrix A. The matrix C is calculated as follows:

$$C = \begin{matrix} 1 & 0 & 0 \\ 0 & 1 & 0 \\ Ox & Oy & 1 \end{matrix}$$

From a conceptual point of view, the matrices A, B, and C could be applied to the strokes sequentially. For an arbitrary stroke S (clean or raw), this would result accomplished as follows:

$$S^T = C \times (B \times (A \times S))$$

Where $S^T$ is the transformation of stroke S. However, for convenience, it is computationally simpler to create a single linear translation matrix M as follows:

$$M = A \times B \times C$$

The linear translation matrix M is then applied to the points of RAWARRAY and CLEANARRAY as follows:

$$S^T_{raw} = M \times [RAWARRAY]$$

$$S^T_{clean} = M \times [CLEANARRAY]$$

More specifically, each (x,y) point of RAWARRAY is converted into a 1×3 matrix |x y1| and then is multiplied by the matrix M to create a point (x',y'), which is its the linear scaling of the (x,y) point. This is also repeated for each (x,y) point of the CLEANARRAY. These transformed points are stored in RAWARRAY and CLEANARRAY, respectively.

Distorting a Stroke

Figure 13:
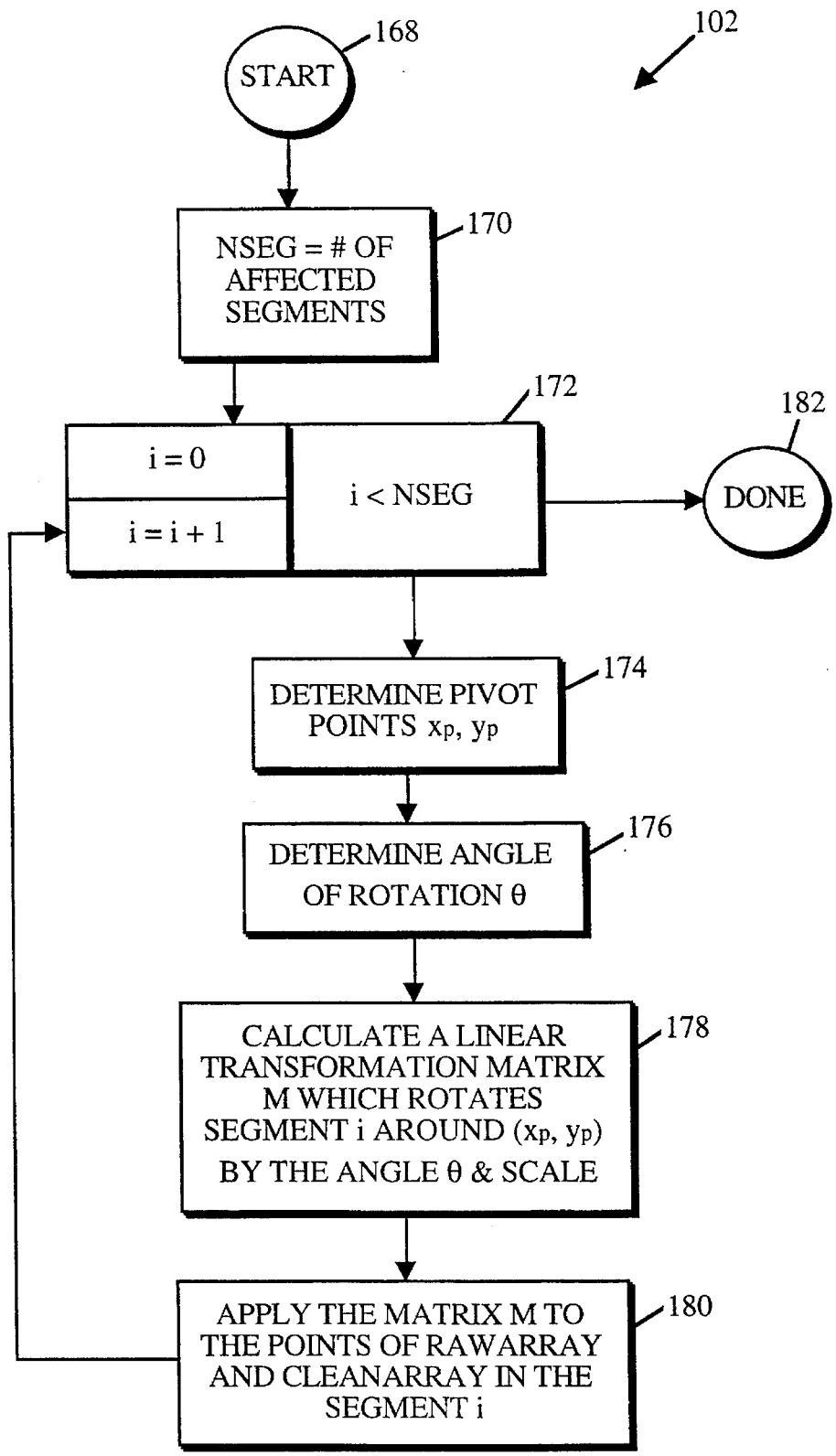
FIG. 13 is a flow diagram illustrating step 102 of FIG. 8 in greater detail.

In FIG. 13, step 102 "DO A DISTORT" of FIG. 8 is illustrated in greater detail. The process 102 begins at 168 and, in a step 170, a variable NSEG is calculated as the number of affected segments in the distortion. In the example of FIGS. 5a and 5b, NSEG=2. Next, in an iterative loop step 172, a counter i is initialized to zero, and is then compared to the variable NSEG. If i is less than NSEG, a step 174 determines the pivot point $(x_p, y_p)$ for the segment i. A step 176 determines the angle of rotation $\phi$ between the original position of the segment and its final position after the dragging action. This angle $\phi$ can be calculated by simple trigonometric techniques. Next, in a step 178, a linear transformation matrix M which rotates segment i around the point $(x_p, y_p)$ by the angle $\phi$ and which scales the segment i is calculated. Finally, in a step 180, the matrix M is applied to the points of the raw array and of the clean array that are within the boundaries of segment i. Process control then returns to step 172, and the loop of steps 174–180 are repeated for all remaining segments. When i is equal to NSEG the process is completed as indicated at 182.

A stroke can be distorted in many ways. For example, a segment of a stroke can be engaged near its middle and "dragged" to create a new vertex. In the present example, a stroke will be distorted by engaging an existing corner and dragging the corner to a new location. Since a corner is defined by the intersection of two segments, this type of distortion will affect two stroke segments.

The distortion of the two stroke segments can be thought of as rotations around pivot points, and a scaling of the pivoted segments. The pivot point for a segment is the endpoint of the segment that is distal from the corner being dragged. The angle $\phi$ is the angle between the original position of the segment and its new position. Again, the mathematical techniques for rotating and scaling segments are well known to those skilled in the art.

The process for rotating the segments will be discussed in terms of segment AB of FIG. 5a. The process is the same for the other affected segment BC of FIG. 5a. A first step in this process is to make the pivot point "A" the upper-left-hand origin of the segment AB, i.e. to transform the segment AB such that point A is at (0,0). The linear transformation matrix A for accomplishing this is as follows:

$$A = \begin{matrix} 1 & 0 & 0 \\ 0 & 1 & 0 \\ -Ax & -Ay & 1 \end{matrix}$$

where the original coordinates of point A were (Ax,Ay).

The next step is to rotate the segment by the angle $\phi$. This is accomplished by a linear rotation matrix B as follows:

$$B = \begin{matrix} \cos\phi & -\sin\phi & 0 \\ \sin\phi & \cos\phi & 0 \\ 0 & 0 & 1 \end{matrix}$$

The angle $\phi$ can be calculated using simple trigonometry by knowing the endpoints of the line segments AB and AB'.

Next, a linear scaling matrix C is calculated to scale the segment appropriately. The scaling factor S can be easily calculated by taking the ratio of the length of segment AB' and the length of segment AB, i.e. S=AB'/AB. The scaling factor can then be broken into its X and Y scaling components, namely Sx and Sy.

$$C = \begin{matrix} Sx & 0 & 0 \\ 0 & Sy & 0 \\ 0 & 0 & 1 \end{matrix}$$

Finally, a linear translation matrix D is calculated to translate the stroke coordinates back to their original position:

$$D = \begin{matrix} 1 & 0 & 0 \\ 0 & 1 & 0 \\ Ax & Ay & 1 \end{matrix}$$

Again, the matrix multiplication can be done sequentially on the points (x,y) of the segment AB but, for convenience, a single transformation matrix M is created as follows:

$$M = A \times B \times C \times D$$

It is this transformation matrix M that is preferably applied to the points (x,y) by forming the (x,y) points into matrices |x y 1|, resulting in a transformed segment AB' having points (x',y').

The process for transforming segment BC is very similar to the process for transforming segment AB. In this instance, the segment BC is rotated around point C and is scaled relative to that point. Therefore, the matrix A has the values −Cx,−Cy substituted for −Ax, −Ay, and the matrix D has the values Cx, Cy substituted for Ax, Ay. Otherwise the process is the same.

Deleting a Segment

Figure 14:
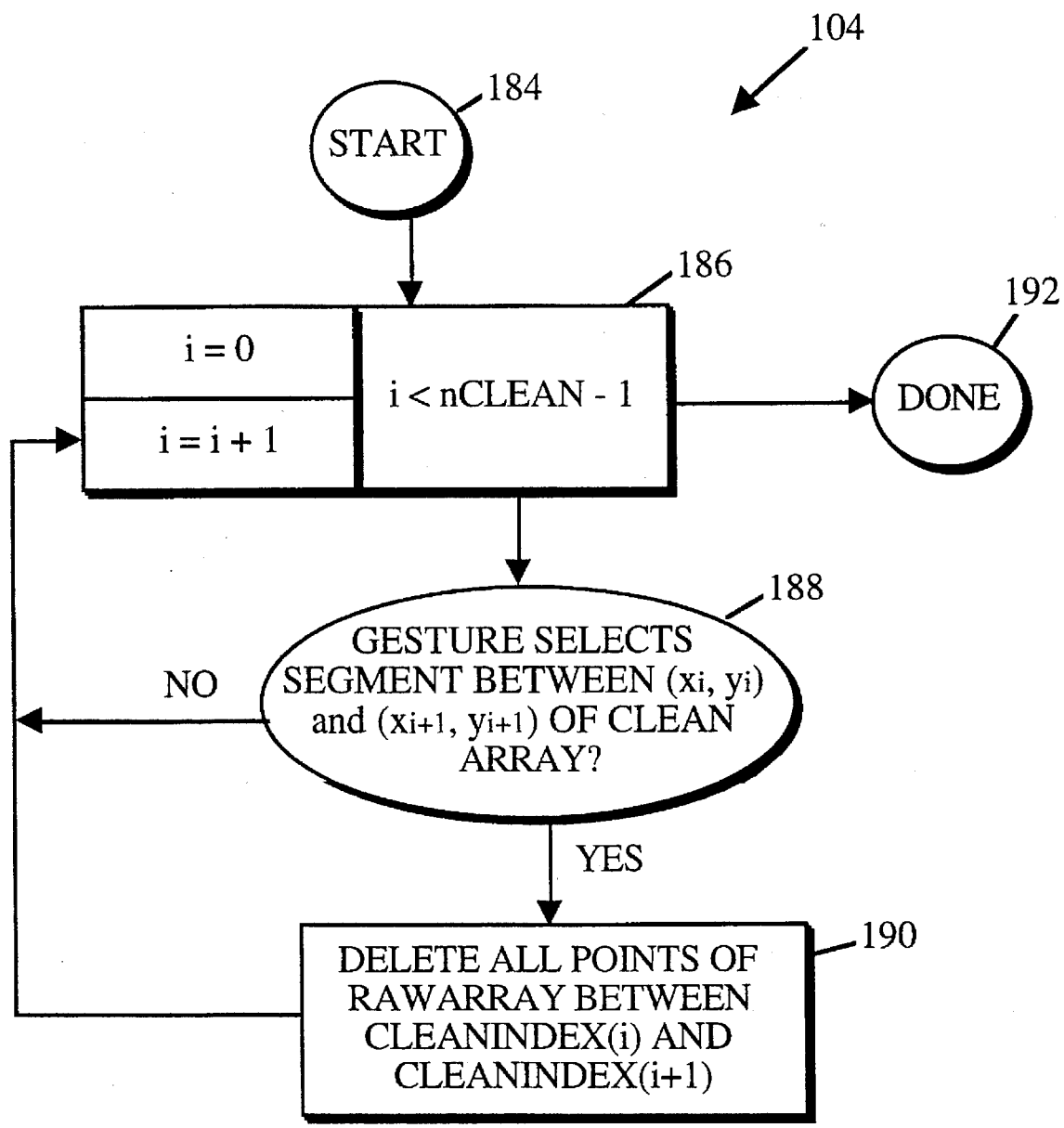
FIG. 14 is a flow diagram illustrating step 104 of FIG. 8 in greater detail.

In FIG. 14, the step 104 of FIG. 8 is illustrated in greater detail. Process 104 begins at 184 and, in a iterative loop step 186, a counter i is initialized to zero and is compared to the variable nClean−1. If i is less than nClean−1, a decision step 188 determines whether a gesture, such as the aforementioned scrub gesture, selects a line between $(x_i, y_i)$ and $(x_{i+1}, y_{i+1})$, of CLEANARRAY. If not, process control is returned to step 186 and the counter i is iterated by 1. If the gesture does select a segment between two points of CLEANARRAY, a step 190 deletes all points of RAWARRAY between CLEANINDEX(i) and CLEANINDEX(i+1). The result of this process 104 is the erasure of a portion of an inked object based upon its relationship to a hidden, simplified representational object (CLEANSTROKE).

In this previous example, an end segment was removed from an inked object. When a central segment is removed, the inked object is preferably broken into two separate inked object pieces, i.e. the object is broken into two, separate "strokes."

While this invention has been described in terms of several preferred embodiments, there are alterations, permutations, and equivalents which fall within the scope of this invention. It should also be noted that there are may alternative ways of implementing the processes of the present invention. For example, much of the programming can be simplified by using the high-level utilities and data structures mentioned in the preceding specification. It is therefore intended that the following appended claims be interpreted as including all such alterations, permutations, and equivalents as fall within the true spirit and scope of the present invention.

What is claimed is:

1. A method for manipulating an inked object comprising the steps of:

receiving an ink stroke made by a pointing device of a computer system, said ink stroke being represented internally to said computer system as an array of ink coordinates;

displaying said ink stroke on a screen of said computer system by displaying a plurality of line segments on said screen which connect pixels of said screen corresponding to said array of ink coordinates;

creating an internal representative stroke from said array of ink coordinates within said computer system, where said representative stroke is not displayed on said screen;

receiving a user-initiated command into said computer system which causes a manipulation of said representative stroke within said computer system;

transforming coordinates of said array of ink coordinates into transformed coordinates in said computer system in accordance with said manipulation of said representative stroke; and re-displaying said ink stroke on said screen of said computer system in accordance with said transformed coordinates of said array of ink coordinates without displaying said representative stroke.

2. A method for manipulating an inked object as recited in claim 1 wherein said step of creating a representative stroke comprises the step of finding corners of said ink stroke.

3. A method for manipulating an inked object as recited in claim 1 wherein said step of receiving a user-initiated command comprises the step of detecting a gesture made by said pointing device.

4. A method for manipulating an inked object as recited in claim 1 wherein said manipulation of said representative stroke comprises scaling said representative stroke.

5. A method for manipulating an inked object as recited in claim 1 wherein said manipulation of said representative stroke comprises distorting said representative stroke.

6. A method for manipulating an inked object as recited in claim 1 wherein said manipulation of said representative stroke comprises deleting at least a portion of said representative stroke.

7. A method for manipulating an object on a screen of a pen-based computer system comprising the steps of:

receiving an ink stroke made by a stylus on a screen of a pen-based computer system, said ink stroke being represented internally to said computer system as an array of ink coordinates;

displaying said ink stroke on said screen by displaying a plurality of line segments on said screen which connect pixels of said screen corresponding to said array of ink coordinates;

creating a representative stroke from said array of ink coordinates within said pen-based computer system, where said representative stroke is not displayed on said screen;

receiving a gesture made by said stylus on said screen into said computer system which causes a manipulation of the representative stroke within said computer system;

transforming coordinates of said array of ink coordinates into transformed coordinates in said pen-based computer system in accordance with said manipulation of said representative stroke; and re-displaying said ink coordinates on said screen of said pen computer system in accordance with said transformed coordinates of said array of ink coordinates without displaying said representative stroke.

8. A method for manipulating an object as recited in claim 7 wherein said ink stroke is a RAWSTROKE comprising a plurality of datapoints stored in a CLEANARRAY, and wherein said representative stroke is a CLEANSTROKE comprising a plurality of data points stored in a CLEANARRAY.

9. A method for manipulating an object as recited in claim 8 wherein said CLEANSTROKE is created by the step of finding ends and corners of said RAWSTROKE and entering datapoints into said CLEANARRAY corresponding to these ends and corners.

10. A method for manipulating an object as recited in claim 9 further comprising the step of detecting a gesture made on said screen by said stylus whereby the manipulation is conducted on said CLEANSTROKE.

11. A method for manipulating an object as recited in claim 10 wherein said step of manipulating comprises at least one of scaling, distorting, and deleting at least a portion of said CLEANSTROKE, which after said transforming will create a like scaling, distorting, or deleting of at least a portion of said RAWSTROKE.

12. An apparatus for manipulating an inked object on a screen of a computer system comprising:

a central processing unit (CPU);

a display screen coupled to said CPU;

pointer means coupled to said CPU;

means for receiving an ink stroke comprising an array of ink coordinates made by said pointer means;

means for displaying said ink stroke on said screen by displaying a plurality of line segments on said screen which connect pixels of said screen corresponding to said array of ink coordinates;

means for creating an internal representative stroke from said array of ink coordinates within said computer system, where said representative stroke is not displayed on said screen;

means for receiving a command made by said pointer means into said computer system which causes a manipulation of said representative stroke within said computer system;

means for transforming coordinates of said array of ink coordinates into transformed coordinates in said computer system in accordance with said manipulation of said representative stroke; and means for re-displaying said ink stroke on said screen means in accordance with said transformed coordinates of said array of ink coordinates without displaying said representative stroke.

13. An apparatus as recited in claim 12 wherein said screen comprises a screen of a pen computer system, and wherein said pointer means comprises tablet means associated with said screen and a stylus engageable with said tablet means.

14. An apparatus as recited in claim 13 wherein said means for receiving a command includes means for recognizing a gesture made by said stylus.

15. An apparatus as recited in claim 14 including means for interpreting said gesture and means for manipulating said representative stroke.

16. An apparatus as recited in claim 13 wherein said tablet means comprises a clear membrane overlying said screen.

* * * * *